United States Patent [19]

Bauchot et al.

[11] Patent Number: 5,220,663
[45] Date of Patent: Jun. 15, 1993

[54] DATA TRANSMISSION SYSTEM WITH A LINK PROBLEM DETERMINATION AID (LPDA) SUPPORT FOR ALL PORTS

[75] Inventors: Frederic Bauchot, Saint Laurent du Var; Bruno Sappa, Nice; Victor Spagnol, Cagnes sur Mer, all of France

[73] Assignee: International Business Machines Corp., Armonk, N.Y.

[21] Appl. No.: 470,475

[22] Filed: Jan. 26, 1990

[30] Foreign Application Priority Data

Mar. 28, 1989 [EP] European Pat. Off. .... 8948000049.9

[51] Int. Cl.[5] .......................................... G06F 11/00
[52] U.S. Cl. ............................. 395/575; 364/943.9; 364/927.95; 364/927.96; 364/DIG. 2; 395/200
[58] Field of Search ... 395/200 MS File, 575 MS File, 395/550 MS File

[56] References Cited

U.S. PATENT DOCUMENTS

| | | |
|---|---|---|
| 4,031,375 | 6/1977 | Jaskulke et al. |
| 4,419,751 | 12/1983 | Cholat-Namy et al. |
| 4,545,029 | 10/1985 | Collier .................. 395/550 |
| 4,922,491 | 5/1990 | Coale .................. 371/16.1 |
| 4,964,036 | 10/1990 | De Azevedo, Jr. et al. ....... 395/575 |
| 5,021,949 | 6/1991 | Morten et al. ............. 395/200 |
| 5,027,269 | 6/1991 | Grant et al. ............. 395/650 |
| 5,047,977 | 9/1991 | Hill et al. ............... 395/575 |

OTHER PUBLICATIONS

IBM Technical Disclosure Bulletin, vol. 24, No. 7A, Dec. 1981, pp. 3508-3509, New York, J. Cholat-Namy et al, "Improved Test Procedure in Transmission Networks".

Patent Abstracts of Japan, vol. 8, No. 4(E-220) [1441], Jan. 10, 1984; 191984; & JP-A-58 170 162 (Fujitsu K.K.) Jun. 10, 1983.

Computer Networks and ISDN Systems, vol. 12, No. 3, 1986, pp. 175-182, Elsevier Science Publishers B. V. (NorthHolland), Amsterdam, NL, T. Togawa et al, "Network Testing System for Digital Data Networks".

Primary Examiner—Gareth D. Shaw
Assistant Examiner—Dennis M. Butler
Attorney, Agent, or Firm—Edward H. Duffield

[57] ABSTRACT

According to the invention, a data transmission system is provided with apparatus which enables the problem determination requests from any ports of the multiplex modems (18) to be processed. When a link event is detected on a port or when a solicited command is received from a host network management facility computer (10), the network control program (NCP) in the communication controller (16) checks with the associated link configuration data as to whether the involved port is port A. If is not port A, NCP looks for port A which has the same NCP correlation number as the involved port. Then, the LPDA message can be sent through port A and can reach the remote corresponding port A if necessary.

1 Claim, 3 Drawing Sheets

DATA TRANSMISSION SYSTEM WITH A LINK PROBLEM DETERMINATION AID (LPDA) SUPPORT FOR ALL PORTS

FIELD OF THE INVENTION

The present invention is directed to data transmission systems wherein a host computer controls the exchange of data between Data Terminal Equipments by the intermediary of Communication Controllers, and relates particularly to a data transmission system provided with the IBM Link Problem Determination Aid (LPDA) support for all ports.

BACKGROUND OF THE INVENTION

Prior Art

Many modem data transmission systems are organized in networks in compliance with a network architecture such as the IBM System Network Architecture (SNA). As an architecture, SNA specifies how the products included in the network connect and communicate with one another.

Generally, a host computer controls all the network. Some of the functions it provides include computation, program execution, access to data bases, directory services, and network management. The network management is under the control of a network management program which assists network operations, detects and reports errors and maintains statistics about network performance. In a network under SNA, the network management program is preferably IBM's NetView, a software program which runs on the host.

The host computer is connected to one or several communication controllers, the purpose of which is to manage the physical network, to control the communication links and to route data through the network. The communication controller contains the Network Control Program (NCP) which routes data and controls its flow between the communication controller and other network resources.

Further information relating to the data transmission networks, and describing particularly the functions of the two IBM softwares NetView and NCP, can be found in the IBM document "Network Program Products General Information", reference GC30-3350.

The communication controllers are linked to a plurality of workstations providing users access to the network, by means of modems and telephone lines. At the one end, a local modem converts digital signals from the communication controller into analog signals to be transmitted over the telephone line, and at the other end, a remote modem converts analog signals received over the telephone line into digital signals for the user's workstation.

Now, modems can be provided with a multiplexing system which enables several data links with one or several communication controllers to be multiplexed in the modem. In this case, the links from the communication controller(s) are attached to several ports in the modem, the data bits received from the different links on the associated ports being time multiplexed each baud time before being modulated and transmitted over the single telephone line. The remote modem is also a multiplex modem, the same number of ports being each linked to an associated workstation.

For the host to dynamically interrogate, test or configure the network, a protocol facility is provided under the control of the Network Control Program of the Communication Controller. This facility, such as Link Problem Determination Aid (LPDA), (for detailed information, see the IBM document "Link Problem Determination Aid", reference SY33-2064-0) defines the general rules of communication between the communication controller and the modem, and in particular defines the message formatting, and principally the set of operational and problem determination commands. Such commands are either unsolicited commands or solicited commands. The unsolicited commands are those commands which are automatically issued by the program NCP upon detection of a modem or line error correction. They are essentially the Modem and Line Test (MLT) and Modem and Line Status (MLS). In this case, the NetView operator only sees the report message from NCP giving the problem parameters (problem locating, problem cause, decision to be taken ... ). The solicited commands are the whole set of operational and test commands, which are initiated by the NetView operator. As for the unsolicited commands, a report message from NCP gives the problem determination/operational command parameters at the end of the command processed.

To process the LPDA commands, hardware and software supports are necessary as well in the communication controller as in the modem.

When the modem is multiplexed between several ports, only one port is provided with the LPDA facility, because it would be expensive and useless to provide all the ports with such a facility. Indeed, for achieving such a possibility, two embodiments could be implemented. The first one would consist in providing all ports with the hardware support and the modem only with the software support, with each port being allowed to access to the common software for any LPDA command on said port. Let's assume that, during an LPDA command is being processed on a port, another command is requested on a different port; the latter command would have to be delayed, because on the one hand the common microcode is of state-driven type (not of the reentrant type) wherein intermediary states of the first command would be modified by the execution of the second common, unless the intermediary states be saved which would require a very important storage capacity of exorbitant cost, and on the other hand, it would be impossible to run a second LPDA command as long as the first command has not processed inasmuch as most of the commands (MLS, MLT, ... ) are using the common telephone line linking the local modem to the remote modem. Such a constraint results from the use as LPDA commands of supervisory messages in the data stream, which are transmitted at a rate of one bit per baud.

A second solution which could come to one's mind, would be to provide each port with the LPDA microcode. Such a solution would be useless insofar as the subsequent commands requested while a first command is being processed, should be queued since, as it is mentioned above, it is not possible to convey the LPDA message over the telephone line as long as the first command has not been processed. Further to be expensive in view of the required storage, the solution would result in consuming an important load preventing the signal processor of the modem from managing other jobs during the time of LPDA processing.

For the above reasons, only port A of a multiplex modem is provided with the LPDA facility. Only the port of program NCP assigned to port A is sysgened with LPDA code whereas the other ports are sysgened as non-LPDA. From a problem determination standpoint, it means that probable causes and recommended actions are provided when NCP has detected a problem on port A, whereas problems which occur on another port only lead to an alert without running any probable cause algorithm. To reduce the problem determination unbalance between port A and port B, a first approach is to capitalize on the correlation number which is common, in NCP, to all port of the multiplex modem. With such a solution, if a single link problem leads to two alerts (one on port A and one on port B), the NetView operator can correlate these alerts thanks to their same correlation number. Unfortunately, this scheme requires that port A be powered on. If not, NCP only detects a problem on port B and the NetView operator cannot take advantage of the LPDA capabilities.

OBJECT OF THE INVENTION

Therefore, the object of the present invention is a data transmission system, including means enabling all ports of the multiplex modems to be considered by the system operator as having the LPDA facility, although only one port of the multiplex modems is provided with the LPDA facility.

BRIEF SUMMARY

In accordance with the invention, a data transmission system includes data processing and transmission means operating with transmission control program means, and a local data communication system connected on the one hand to the processing and transmission means by at least two ports, and on the other hand to a single transmission line for communication with a remote data communication system so as to define at least two communication links respectively associated to the ports. The transmission management program comprises a link problem determination aid (LPDA) program able to determine and solve problems on the link associated to only port A. The system is characterized in that the transmission control program comprises a correlation program which, in response to a request destined to perform a problem determination on a link not associated to port A, enables the problem determination message to be sent on the link associated to said port A, whereby the transmission system is seen by the system operator as having the LPDA facility for all ports.

The foregoing and other objects, features and advantages of the invention will be more fully understood from the following description as illustrated in the accompanying drawings wherein:

DESCRIPTION OF THE PREFERRED EMBODIMENT

Figure 1:
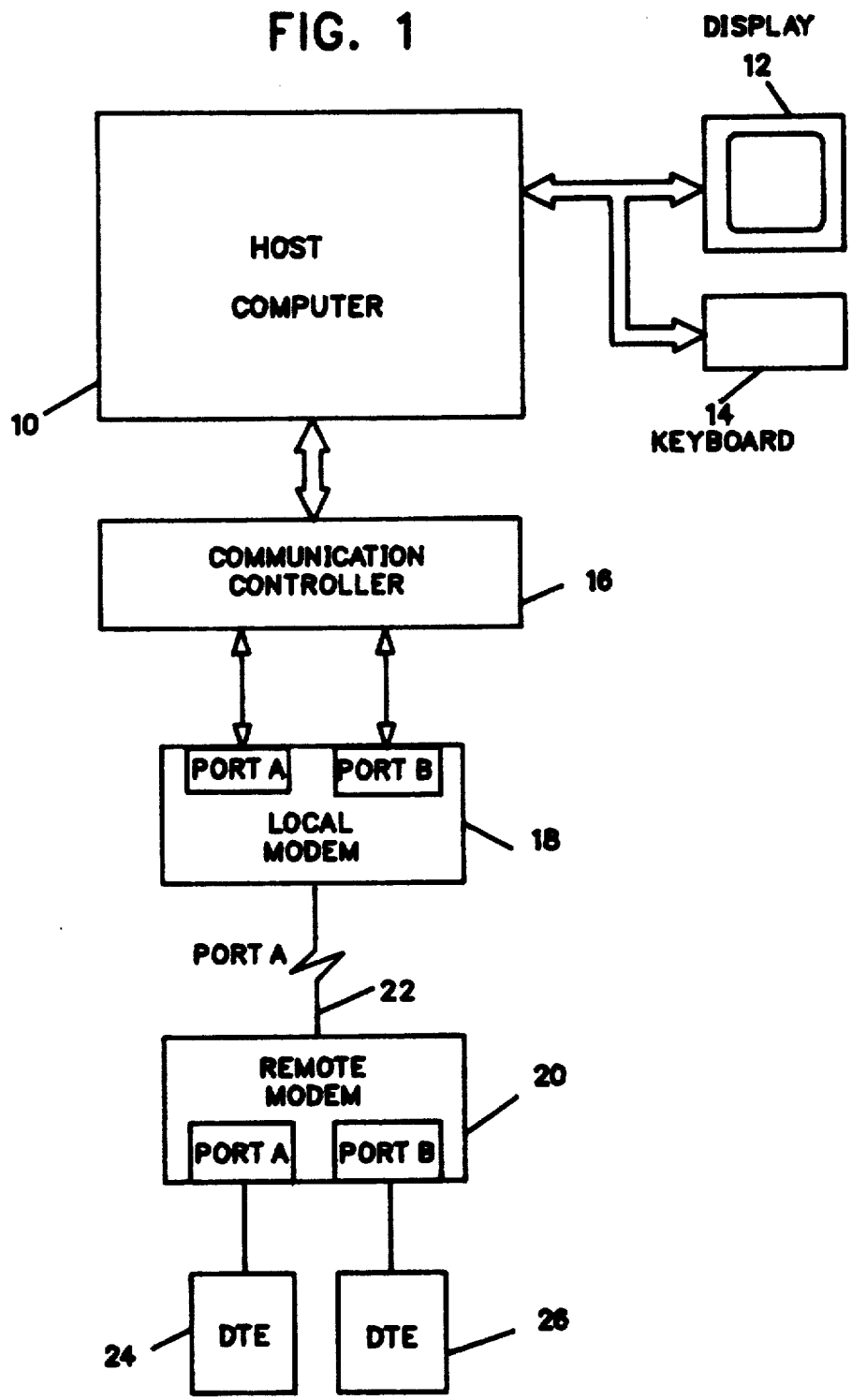
FIG. 1 is a block diagram of a data transmission network wherein the invention can be used.

A modem transmission network includes a host computer which is connected to a plurality of communication controllers. Each communication controller is connected to a plurality of local modems linked by means of telephone lines to the corresponding remote modems, themselves connected to the remote DTEs. Thus, FIG. 1 shows the host computer 10 with its operator console comprising display 12 and keyboard 14, connected to a communication controller 16. A multiplex local modem 18 is connected to communication controller 16 by two ports A and B (though only two ports are considered in the Figure, a multiplex modem can have more than two ports). Local modem 18 is linked to remote multiplex modem 20 by means of telephone line 22. Remote modem 20 is connected to DTEs 24 and 26 respectively by ports A and B. Communication controller 16 is equivalent to a DTE which communicates either with DTE 24 by means of port A of local modem 18, telephone line 22, and port A of remote modem 20, or with DTE 26 by means of port B of local modem 18, telephone line 22, and port B of remote modem 20. It must be noted that, instead of DTEs 24 or 26, there could be another link comprising a primary modem and a secondary modem connected by a telephone line.

As already explained, the host computer is provided with a network management program such as IBM's NetView, which is in charge of managing the entire transmission network, and the communication controller is provided with a network control program such as IBM's Network Control Program (NCP), the function of which is the monitoring, routing and control of the data being transmitted. A problem occurring on port A or port B is detected by NCP as a LINK EVENT which initiates the running of one unsolicited command of the Link Problem Determination Aid (LPDA) protocol. With the incorporation of the invention, the execution of this unsolicited command is automatically performed under the control of program NCP without any intervention of the operator at the host computer, whether the port on which the problem has been detected is provided with the LPDA facility or not. Likewise for the solicited commands, originated from the NetView operator, which are processed in the same way whatsoever the port on which the command is sent.

Figure 2:
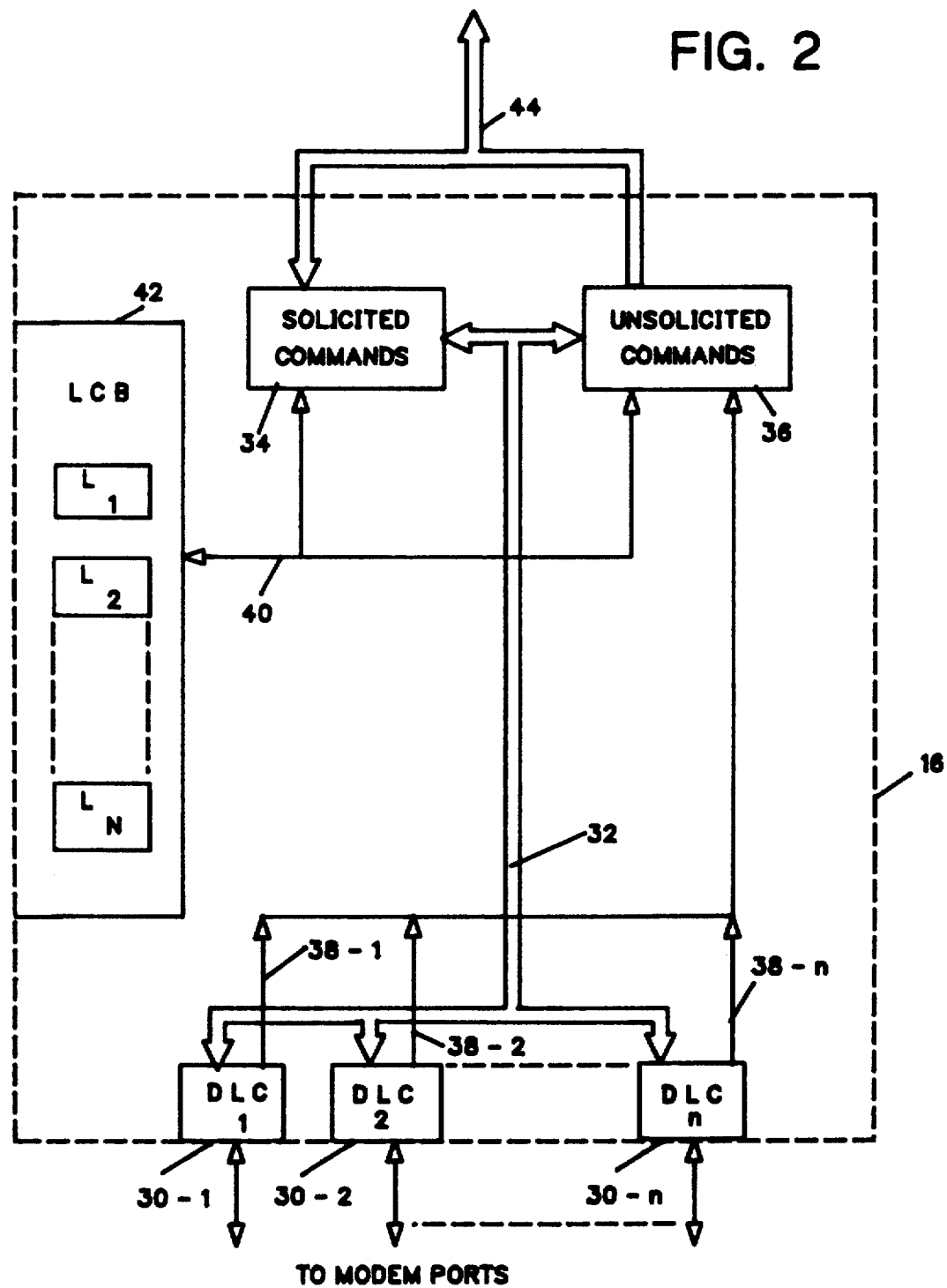
FIG. 2 is a block diagram showing the main functions incorporated in the communication controller, enabling the invention to be implemented.

FIG. 2 is a simplified diagram showing the parts of communication controller 16 useful for the understanding of the invention.

Communication controller 16 interfaces with the lines connected to the modem ports by means of Data Link Control (DLC) blocks 30-1 to 30-n. The LPDA data comprising solicited and unsolicited commands from the communication controller to the modems, and reports to these commands from the modems to the communication controller, are exchanged by means of bus 32. Bus 32 is connected to two blocks 34, 36 of NCP respectively in charge of solicited commands (block 34) and unsolicited commands (block 36).

LINK EVENT information is detected on either port connected to one of DLCs 30-1 to 30-n, by means of one of the Link Event lines 38-1 to 38-n. This Link Event information is transmitted to block 36 of NCP in charge of unsolicited commands. When such an information is received by NCP block 36, the portion of NCP relative to the line attributes is addressed. This NCP portion 42 is composed of the Line Control Block (LCB) for lines 1 to n (noted L1, L2, ..., Ln) respectively connected to DLC1 to DLCn. Each LCB contains 4 attributes which are important for the present invention.

They are:

LPDA, the contents of which are YES or NO indicating whether the modem port corresponding to the LCB supports the protocol LPDA.

CHANNELIZED, the contents of which are YES or NO indicating whether the corresponding line is connected to a multiplex modem or not.

PORT, the contents of which are the number of the port (A, B, C, . . . ) associated with the LCB, in case of multiplex modem.

CORNUM, the contents of which give the correlation number that is the number assigned to the modem incorporating the corresponding port.

If the addressed LCB corresponds to a port of a modem supporting to protocol LPDA (LPDA=YES), and also corresponds to a channelized multiplex modem (CHANNELIZED=YES) the port number is checked. Assuming that the problem is on port A (PORT=A), which is the port supporting the LPDA protocol, the program NCP can run the unsolicited command directly on this port. But, assuming that the problem is on port B (PORT=B) the contents of CORNUM are then addressed to have the correlation number of the port. As all the ports sharing a modem have the same correlation number, it is easy to know the address of the port A sharing the same modem. Then, the program NCP can transmit the unsolicited command corresponding to the problem detected on port B, on this port A. The report to the LPDA command, which will enable the problem determination, is also received via the port A. Therefore, the NetView operator will not receive alerts which cannot be processed because they correspond to ports not supporting the LPDA protocol. It can think that all ports support LPDA since every unsolicited command is processed by the program NCP, whether it corresponds to a port A or not. The NetView operator is only informed of the results of the LPDA command by means of bus 44.

As far as the solicited commands are concerned, they are initiated by the NetView operator, and received via bus 44 into NCP block 34. Then, this procedure is exactly the same as for the unsolicited commands as described above.

Of course, it is assumed that port A and the line attached thereto is active so that the LPDA command can be transmitted and the report can be received. If not, this can means that an alert had previously been detected on port A indicating a problem on this port and that a diagnostic procedure is being run.

Likewise, there is a possibility that an LPDA command be requested on another port B, C, . . . while a prior command is being processed on port A. If so, a flag is put in the LCB associated to port A indicating that the latter is unavailable. The processing of the subsequent command is reduced to a "Test in progress" report to NetView.

Figure 3:
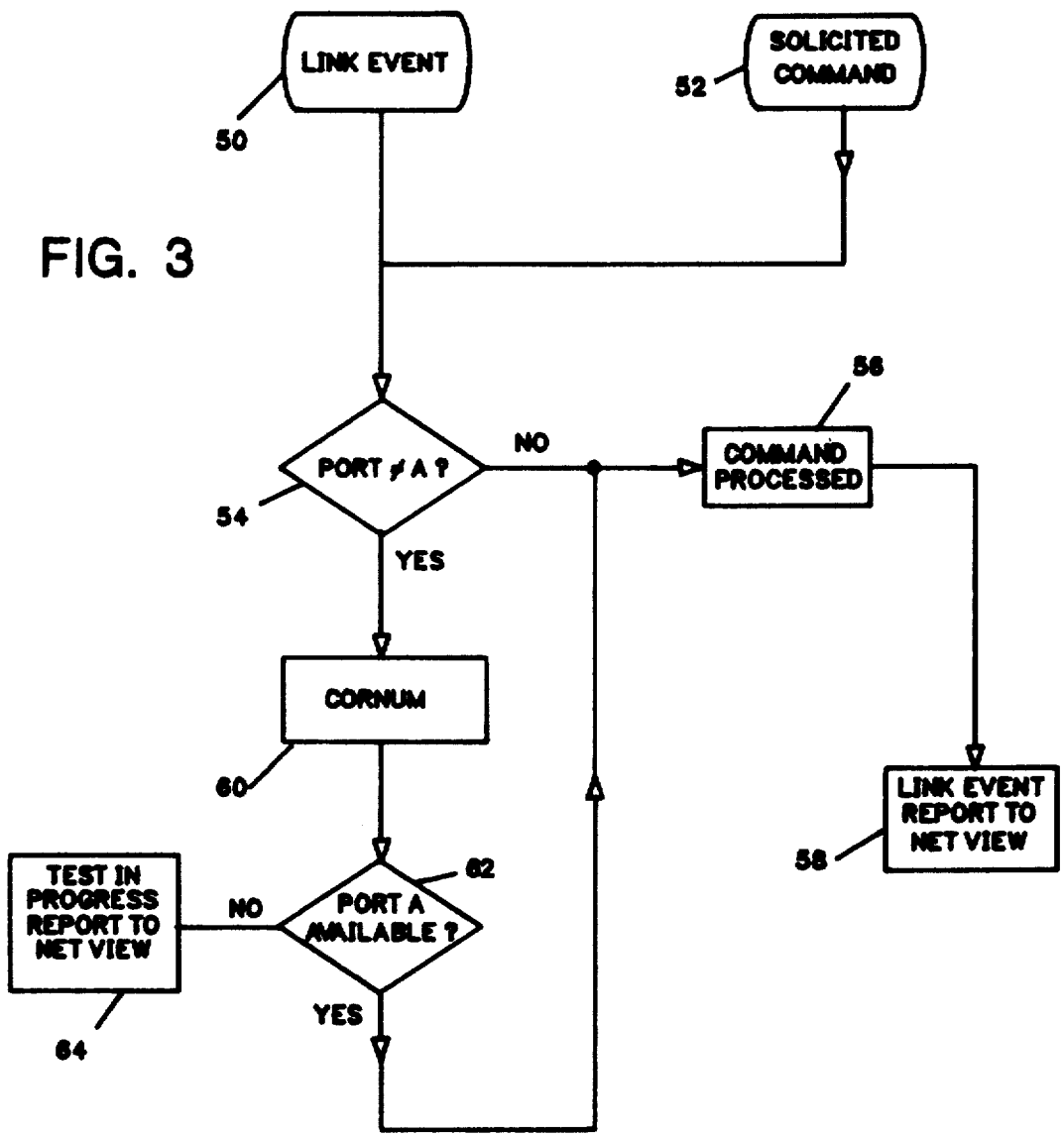
FIG. 3 is a flow chart depicting the steps which are taken to implement the invention when a problem determination is to be made.

FIG. 3 depicts a flow diagram of the steps which are followed when a LPDA command is requested. First, a link event condition (50) has been detected or a solicited command (52) is requested by NetView. In the first step, the attribute to check in LCB is the identification of the port (54) on which the problem determination is to be made. If the involved port is port A, therefore provided with the LPDA facility, the command is processed (56) and after completion, a link event report is sent to NetView (58). If not, this means that the port involved is different from port A and the attribute CORNUM is checked (60) to determine the correlation number assigned to the modem incorporating the port. This correlation number enables to determine the port A which has to be used for the command processing. Then, nest step is to determine whether the assigned port A is available (62). If not a "Test in progress" report is sent to NetView (64). If port A is available, the command can be processed (56) in the same way as if the problem determination was on port A, whereby the NetView operator sees all ports of the system provided with the LPDA facility.

It must be noted that, in the LPDA command frame issued from NCP, is defined a "Port Field" reflecting the port attribute of the link where NCP would have issued the LPDA command if the modem were LPDA supported on all ports. If the information to be returned in the LPDA response by the modem is related to a port (such a DTE interface status), the modem reports the information pertaining to the port as referenced in the "Port Field".

We claim:

1. A computer implemented method of transmitting a problem determination message over a communication link in a data transmission system having a host computer executing a system management program and data transmission means connected thereto operating together via execution of a transmission control program in said data transmission means to exchange data with a local data communication system connected to said host computer and said data transmission means by at least two communication ports and to a single data communication line for communication with a remote data communication system;

said at least two communication ports defining at least two communication links associated respectively with said communication ports;

said transmission control program comprising a link problem determination aid program which, when executed, diagnoses and recommends solutions to rectify communication link failures on any one of said at least two communication links, said solutions being furnished by said transmission control program in response to unsolicited commands from any one of said two communication ports or to solicited commands from said host computer with said solicited commands being related to any one of said communication ports, said solutions being able to be transmitted by means of only one communication port;

said computer implemented method including the following steps:

reading a Line Control block in said transmission means, said Line Control Block corresponding to the port associated with the communication link involved in an unsolicited or solicited command, determining if said port associated with said involved link is other than said only one communication port, and if so, determining in said Link Control Block a correlation number assigned to said port associated with said involved link, and transmitting said problem determination aid message which is a solution to said unsolicited or solicited command, by means of said only one communication port.

* * * * *